United States Patent
Hori

(10) Patent No.: US 12,199,659 B2
(45) Date of Patent: Jan. 14, 2025

(54) TRANSMISSION DEVICE, RECEPTION DEVICE, COMMUNICATION SYSTEM, CONTROL CIRCUIT, STORAGE MEDIUM, TRANSMISSION METHOD, AND RECEPTION METHOD

(71) Applicant: Mitsubishi Electric Corporation, Tokyo (JP)

(72) Inventor: Yuta Hori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 36 days.

(21) Appl. No.: 18/206,665

(22) Filed: Jun. 7, 2023

(65) Prior Publication Data

US 2023/0318657 A1   Oct. 5, 2023

Related U.S. Application Data

(63) Continuation of application No. PCT/JP2021/004777, filed on Feb. 9, 2021.

(51) Int. Cl.
*H04B 1/707* (2011.01)
*H04L 27/144* (2006.01)
*H04B 1/69* (2011.01)

(52) U.S. Cl.
CPC ........... *H04B 1/707* (2013.01); *H04L 27/144* (2013.01); *H04B 2001/6912* (2013.01)

(58) Field of Classification Search
CPC ............ H04B 1/707; H04B 2001/6912; H04L 27/144

USPC ........................................................ 375/139
See application file for complete search history.

(56) References Cited

U.S. PATENT DOCUMENTS 10,491,261 B1 * 11/2019 Al-Eidan ............ H04L 27/2003

OTHER PUBLICATIONS

International Search Report (PCT/ISA/210), issued in PCT/JP2021/004777, dated Apr. 27, 2021.
Vitetta et al., "Optimal Noncoherent Detection of FSK Signals Transmitted Over Linearly Time-Selective Rayleigh Fading Channels", IEEE Transactions on Communications, Nov. 1997, vol. 45, No. 11, pp. 1417-1425.

* cited by examiner

*Primary Examiner* — Leila Malek
(74) *Attorney, Agent, or Firm* — BIRCH, STEWART, KOLASCH & BIRCH, LLP

(57) ABSTRACT

A transmission device that wirelessly communicates with a reception device includes an FSK modulation unit that performs frequency shift keying modulation on an input information bit sequence to generate a frequency shift keying symbol, a direct-sequence spreading unit that spreads the frequency shift keying symbol by direct-sequence spreading using a chirp sequence, and an FSK carrier spacing control unit that controls a signal to be transmitted to the reception device in such a manner as to prevent a delayed-wave component in multipath propagation from appearing in a frequency shift keying candidate carrier in one symbol of two consecutive symbols, in a frequency spectrum of a signal obtained by despreading in the reception device.

14 Claims, 5 Drawing Sheets

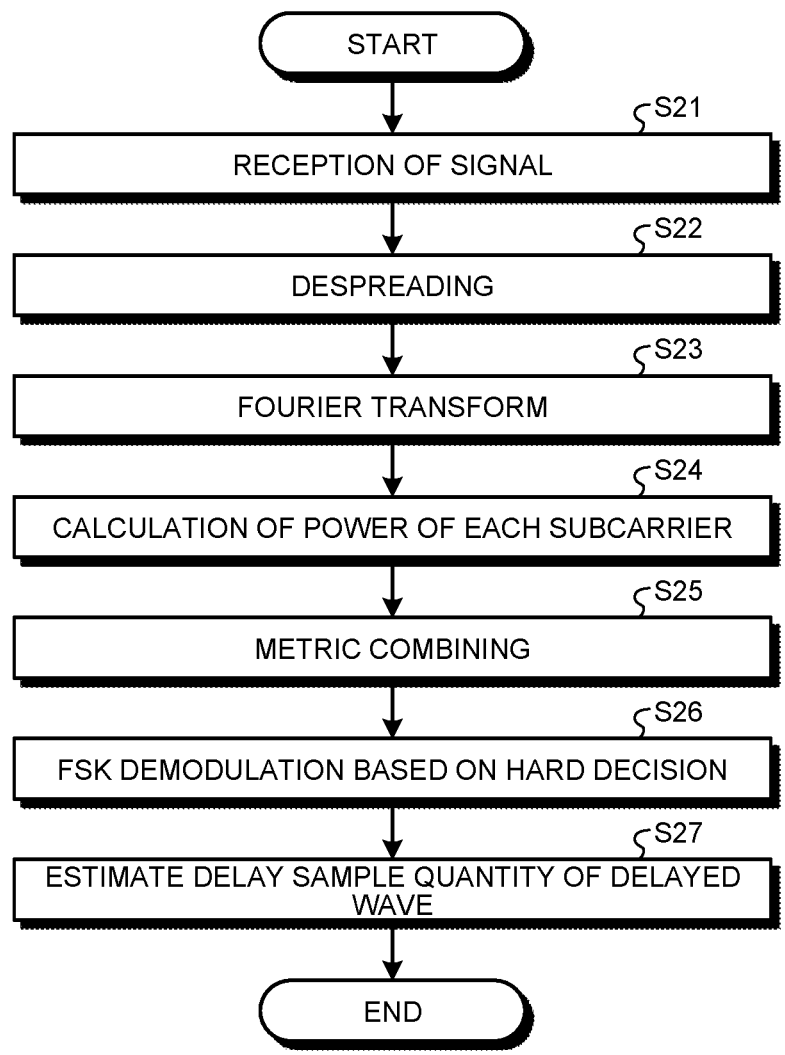
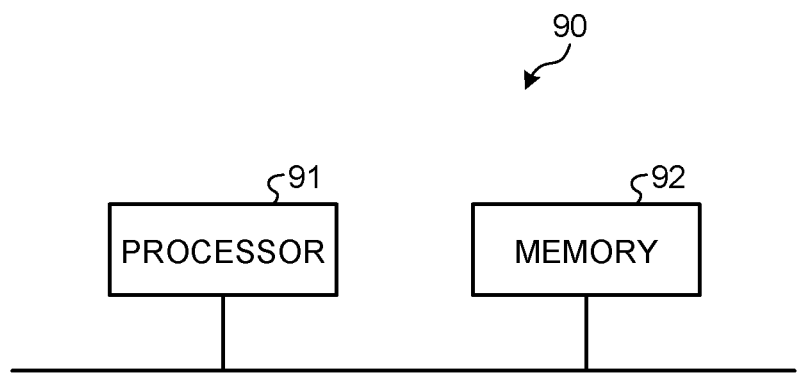

TRANSMISSION DEVICE, RECEPTION DEVICE, COMMUNICATION SYSTEM, CONTROL CIRCUIT, STORAGE MEDIUM, TRANSMISSION METHOD, AND RECEPTION METHOD

CROSS-REFERENCE TO RELATED APPLICATION

This application is a continuation application of International Application PCT/JP2021/004777, filed on Feb. 9, 2021, and designating the U.S., the entire contents of which are incorporated herein by reference.

BACKGROUND OF THE INVENTION

1. Field of the Invention

The present disclosure relates to a transmission device, a reception device, a communication system, a control circuit, a storage medium, a transmission method, and a reception method each for performing wireless communication.

2. Description of the Related Art

Frequency shift keying (hereinafter referred to as FSK) is a modulation scheme that changes the frequency of a carrier wave in accordance with information to be transmitted. FSK technology is known as offering a much higher power efficiency than a phase shift keying (hereinafter referred to as PSK) technique, a quadrature amplitude modulation (hereinafter referred to as QAM) technique, etc. because FSK uses a modulation signal having a constant envelope amplitude and sets a low input back-off value in a power amplifier. On the other hand, the FSK technology offers a frequency use efficiency lower than those of PSK, QAM, etc.

A receiver of a wireless communication system generally uses either coherent detection or noncoherent detection. A coherent detection technique, which synchronizes the phase of a reception signal with the phase of a transmission signal before demodulation, can provide high accuracy demodulation. For the coherent detection technique, a pilot signal for estimating the phase shift generated in the propagation channel needs transmitting at the same time. This pilot signal imposes an overhead, which reduces transmission efficiency. In contrast, a noncoherent detection technique, which demodulates signals without synchronization between phases of transmission and reception signals, has a lower demodulation performance than that of coherent detection, but provides higher transmission efficiency because of reduction in the overhead of the pilot signal. With such a noncoherent detection technique, the reception circuit is simplified. For the FSK technology, the signal power concentrates on different frequencies correspondingly to different information contents transmitted, thereby achieving noncoherent detection very simply using filtering operation and power detection. For example, Non-Patent Literature 1, G. M. Vitetta, U. Mengali, and D. P. Taylor, "Optimal Noncoherent Detection of FSK Signals Transmitted over Linearly Time-Selective Rayleigh Fading Channels", IEEE Transactions on Communications, Vol. 45, No. 11, pp. 1417-1425, November 1997 discloses a technology of noncoherent detection scheme in which power of each FSK candidate channel is calculated, and one having the maximum power is demodulated as the estimated transmission signal.

Recently, attention has been directed to a wireless communication system of a type called low-power, wide-area (LPWA), which aims at long distance, highly reliable information transmission. Many of the standards relating to LPWA technology provide that a narrowband primary modulated signal is spread by spectrum spreading into a wideband secondary modulated signal, and the secondary modulated signal is transmitted. This provides highly reliable information transmission even in long distance communication with a high transmission loss. For example, a long range wide area network (LoRaWAN) technology spreads an FSK signal by spectrum spreading based on a direct sequence technique using spreading sequence that is a chirp signal having a frequency linearly changing over time, and then transmits the resulting signal.

When, as in conventional schemes, an FSK signal is transmitted in the form of a narrowband primary modulated signal, the FSK signal is little affected by frequency selectivity due to multipath propagation in the communication channel. However, when an FSK signal is spread by spectrum spreading, and the resulting wideband signal is then transmitted, frequency selectivity of the communication channel has a large effect on demodulation performance. In coherent detection, the receiver equalizes the effect of multipath propagation by means of transmission channel estimation using a pilot signal, and can thus obtain a diversity gain. On the contrary, in noncoherent detection such as one disclosed in the above Non-Patent Literature 1, the receiver cannot estimate the transmission channel, which result in failure to obtain a diversity gain. In addition, when despreading is performed on a wideband signal having unremoved frequency selectivity distortion due to multipath propagation, an autocorrelation characteristic of the chirp sequence may cause delayed-wave power of multipath propagation to leak into an FSK candidate carrier during FSK demodulation. As a result, a demodulation error occurs. Specifically, when the number of delay samples of the delayed wave corresponding to the preceding wave in multipath propagation is an integer multiple of the FSK carrier spacing, delayed-wave power will appear in an FSK candidate carrier.

The present disclosure has been made in view of the foregoing, and it is an object of the present disclosure to provide a transmission device that transmits a signal to a reception device of a wireless communication system employing noncoherent detection for frequency shift keying modulation involving chirp spread spectrum, the signal enabling the reception device to avoid causing a demodulation error due to multipath propagation, and to benefit from a diversity effect of multipath propagation without using a pilot signal.

SUMMARY OF THE INVENTION

To solve the above problem and achieve the object, the present disclosure provides a transmission device to wirelessly communicate with a reception device. The transmission device comprising: a modulation unit to perform frequency shift keying modulation on an input information bit sequence to generate a frequency shift keying symbol; a direct-sequence spreading unit to spread the frequency shift keying symbol by direct-sequence spreading using a chirp sequence; and a control unit to control a signal to be transmitted to the reception device in such a manner as to prevent a delayed-wave component in multipath propagation from appearing in a frequency shift keying candidate carrier in one symbol of two consecutive symbols, in a frequency spectrum of a signal obtained by despreading in the reception device.

BRIEF DESCRIPTION OF THE DRAWINGS

FIG. 5 is a flowchart illustrating an operation of the reception device according to the first embodiment;

FIG. 6 is a diagram illustrating an example configuration of a processing circuitry included in the transmission device according to the first embodiment when the processing circuitry is implemented by a processor and a memory;

DETAILED DESCRIPTION OF THE PREFERRED EMBODIMENTS

A transmission device, a reception device, a communication system, a control circuit, a storage medium, a transmission method, and a reception method according to embodiments of the present disclosure will be described in detail below with reference to the drawings.

First Embodiment

Figure 1:
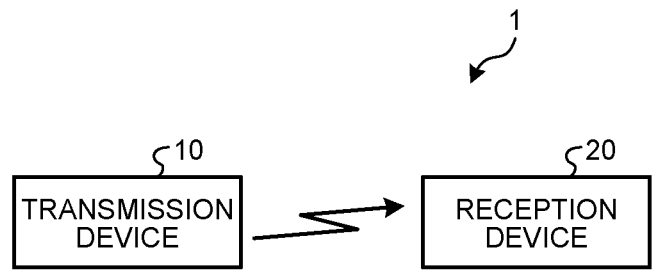
FIG. 1 is a diagram illustrating an example configuration of a communication system according to a first embodiment.

FIG. 1 is a diagram illustrating an example configuration of a communication system 1 according to a first embodiment. The communication system 1 includes a transmission device 10 and a reception device 20. The communication system 1 is a wireless communication system that performs wireless communication in such a manner that the transmission device 10 transmits a wireless signal and the reception device 20 receives the wireless signal.

Figure 2:
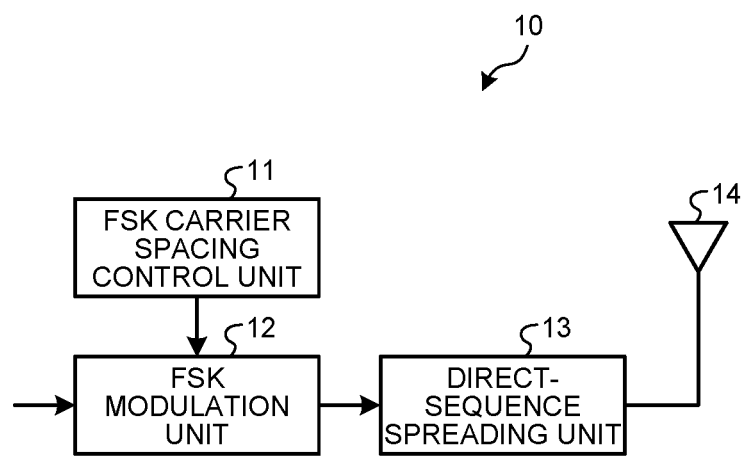
FIG. 2 is a block diagram illustrating an example configuration of a transmission device according to the first embodiment.
Figure 3:
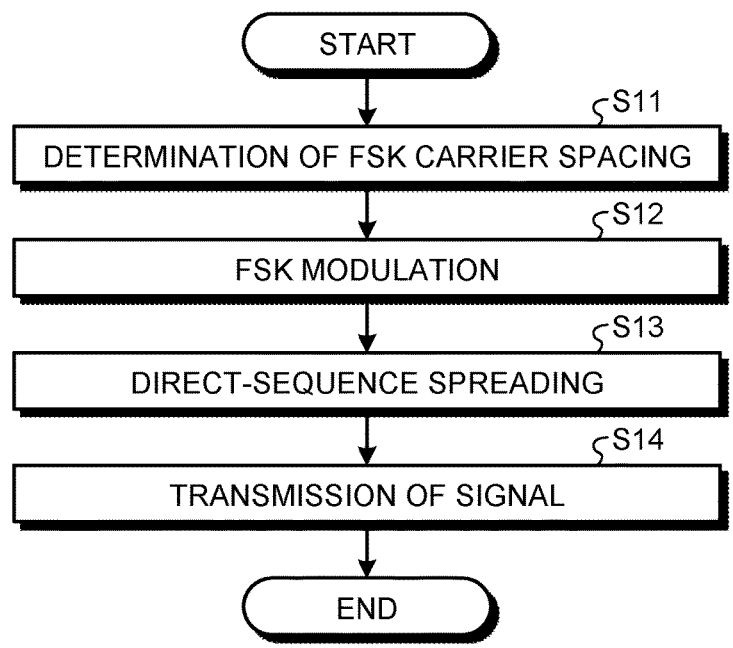
FIG. 3 is a flowchart illustrating an operation of the transmission device according to the first embodiment.

A configuration and an operation of the transmission device 10 will first be described. FIG. 2 is a block diagram illustrating an example configuration of the transmission device 10 according to the first embodiment. The transmission device 10 includes an FSK carrier spacing control unit 11, an FSK modulation unit 12, a direct-sequence spreading unit 13, and a transmitting antenna 14. FIG. 3 is a flowchart illustrating an operation of the transmission device 10 according to the first embodiment.

In the transmission device 10, the FSK carrier spacing control unit 11 determines the carrier spacing of an FSK symbol generated by the FSK modulation unit 12 (step S11). The FSK carrier spacing control unit 11 outputs the value of the carrier spacing of the FSK symbol determined, to the FSK modulation unit 12.

On the basis of the carrier spacing of the FSK symbol determined by the FSK carrier spacing control unit 11, the FSK modulation unit 12 performs FSK modulation on an input information bit sequence (step S12). Specifically, the FSK modulation unit 12 performs FSK modulation on the basis of a carrier spacing $K_i$ of an i-th FSK symbol determined by the FSK carrier spacing control unit 11 and generates an M-ary FSK signal, i.e., an FSK symbol, as expressed by Equation (1).

Formula 1

$$s_n = \exp\left(j\frac{2\pi m_i K_i}{N}n\right) \qquad (1)$$

In Equation (1), $m_i$ is a symbol number generated from an i-th information bit sequence input to the FSK modulation unit 12, and is in a range $0 \leq m_i \leq M-1$; and N is a direct-sequence spreading length based on a chirp sequence. That is, M FSK-symbols are allocated along the frequency axis every $K_i$ subcarriers starting from the zeroth subcarrier of a total of N subcarriers. In the present embodiment, the FSK carrier spacing control unit 11 provides control that allows the carrier spacing $K_i$ to vary from symbol to symbol, such that, in particular, the carrier spacing $K_i$ and the carrier spacing $K_{i+1}$ selected for two consecutive symbols are prime to each other.

In the case of the communication channels coherent with each other for two respective consecutive symbols, it become possible to avoid a situation where delayed-wave power appears in an FSK candidate carrier in the (i−1)-th symbol even when delayed-wave power appears in an FSK candidate carrier in the i-th symbol, in a frequency spectrum obtained by despreading in the reception device 20. Note that the reception device 20 as will be described later uses that characteristic to detect the position of the delayed wave in the i-th symbol and perform demodulation taking into consideration the position of this delayed wave in demodulating the (i+1)-th symbol, such that the reception device 20 can obtain a diversity gain as well as avoiding causing a demodulation error. Note that the FSK modulation unit 12 may be hereinafter referred to simply as modulation unit.

The direct-sequence spreading unit 13 spreads the FSK symbol generated by the FSK modulation unit 12 by direct-sequence spreading using a chirp sequence (step S13). The chirp sequence used in the direct-sequence spreading unit 13 is expressed as Equation (2).

Formula 2

$$c_n = \exp\left(j\frac{q\pi}{N}n^2\right) \qquad (2)$$

In Equation (2), q represents a chirp sequence number. In the present embodiment, chirp sequences whose q values are the same are used for all the FSK symbols. The signal generated by the direct-sequence spreading unit 13 using direct-sequence spreading is expressed as Equation (3).

Formula 3:

$$x_n = s_n \cdot c_n \qquad (3)$$

The transmitting antenna 14 transmits, to the reception device 20, the signal $x_n$ generated by the direct-sequence spreading unit 13 using direct-sequence spreading to the reception device 20 (step S14).

In the first embodiment, the FSK carrier spacing control unit 11 is a control unit that controls the signal to be transmitted to the reception device 20 in such a manner as to prevent the delayed-wave component in multipath propagation from appearing in an FSK candidate carrier in one symbol of two consecutive symbols, in a frequency spectrum of a signal obtained by despreading in the reception device 20. Specifically, the FSK carrier spacing control unit 11 changes the carrier spacing $K_i$ of an FSK symbol on a per-symbol basis in such a manner that the carrier spacings $K_i$ of FSK symbols selected for two consecutive symbols are prime to each other.

Figure 4:
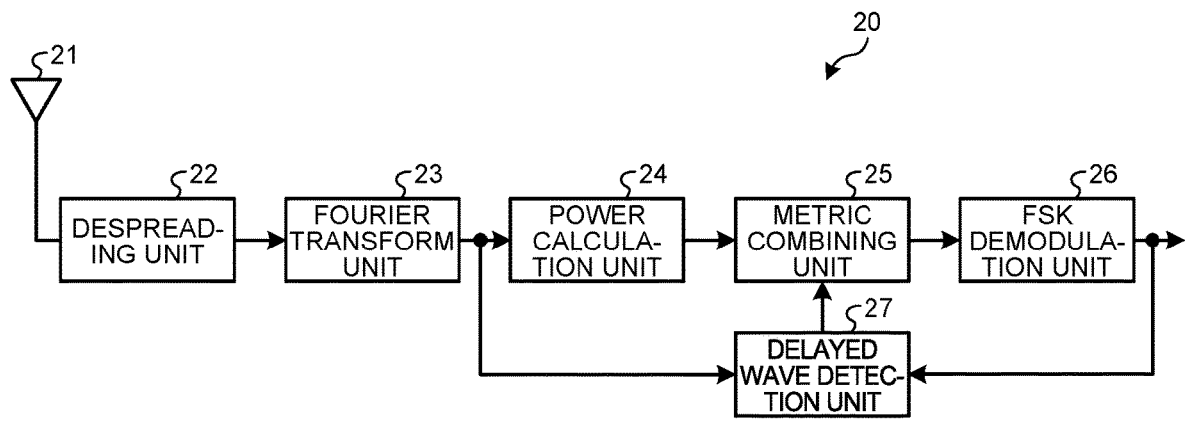
FIG. 4 is a block diagram illustrating an example configuration of a reception device according to the first embodiment.

A configuration and an operation of the reception device 20 will next be described. FIG. 4 is a block diagram illustrating an example configuration of the reception device 20 according to the first embodiment. The reception device 20 includes a receiving antenna 21, a despreading unit 22, a Fourier transform unit 23, a power calculation unit 24, a metric combining unit 25, an FSK demodulation unit 26, and a delayed wave detection unit 27. FIG. 5 is a flowchart illustrating an operation of the reception device 20 according to the first embodiment. Note that the reception device 20 performs the processing described below on each reception symbol.

In the reception device 20, the receiving antenna 21 receives a signal $r_n$ transmitted from the transmission device 10 (step S21). The despreading unit 22 despreads the signal $r_n$ received by the receiving antenna 21 as expressed by Equation (4) (step S22).

Formula 4:

$$\hat{s}_n = r_n \cdot c_n^* \quad (4)$$

Note that as the description cannot mark a character having a circumflex or hat-mark (^) over $s_n$, a character having ^ over $s_n$ is hereinafter referred to as "$s_n$(hat)". The Fourier transform unit 23 performs Fourier transform of a length N on the signal $s_n$(hat) obtained by despreading in the despreading unit 22 (step S23). That is, the Fourier transform unit 23 converts the post-despreading signal $s_n$(hat) into a signal along the frequency axis to thereby generate a frequency signal.

The power calculation unit 24 calculates the power of each subcarrier of the frequency signal obtained by the conversion performed by the Fourier transform unit 23 (step S24). Of the calculated power values of the individual subcarriers, the power of the subcarrier that is a candidate point for an FSK candidate carrier is determined, by the power calculation unit 24, to be the metric of the corresponding FSK candidate symbol. Assume that the carrier spacing $K_i$ of each transmission symbol determined by the FSK carrier spacing control unit 11 of the transmission device 10 is known to the reception device 20.

The metric combining unit 25 adds the power of the subcarrier at a position cyclically shifted in the forward direction by the delay sample quantity from the candidate point of each FSK candidate carrier, to the metric of the corresponding FSK candidate symbol, on the basis of the delay sample quantity of the delayed wave estimated for symbols up to the symbol immediately before that reception symbol. That is, the metric combining unit 25 calculates a combined metric (step S25). The metric of the FSK symbol corresponding to the $m_i$-th subcarrier is expressed as Equation (5).

Formula 5:

$$\lambda_{m_i} = \Sigma_{l=0}^{L} P((m_i - \tau_l) \bmod N) \quad (5)$$

In Equation (5), L is the total number of estimated delayed waves; $\tau_l$ is the delay sample quantity of an l-th delayed wave; k(P) is the power of a k-th subcarrier calculated by the power calculation unit 24. Note that l=0 represents the preceding wave, and thus $\tau_0 = 0$. Although Equation (5) expresses metric combining based on a maximal ratio combining rule, the metric combining method used in the metric combining unit 25 is not limited thereto. The metric combining unit 25 may perform metric combining based on a selection combining rule such as one expressed by Equation (6).

Formula 6

$$\lambda_{m_i} = \max_{0 \le l \le L} P((m_i - \tau_l) \bmod N) \quad (6)$$

The FSK demodulation unit 26 performs a hard decision on the combined metric of each FSK candidate symbol calculated as described above, and estimates a FSK signal transmitted from the transmission device 10. That is, the FSK demodulation unit 26 performs FSK demodulation based on hard decision (step S26). Note that the result of the hard decision of the FSK demodulation unit 26 is for use in the delayed wave detection unit 27 following the FSK demodulation unit 26, and does not necessarily need to be used as a final demodulation result. For example, when channel coding is to be performed, the reception device 20 outputs the metric output from the metric combining unit 25, to a channel decoder (not illustrated) following the reception device 20, and the output to the channel decoder is used as the demodulation result. The FSK demodulation unit 26 may be hereinafter referred to simply as demodulation unit.

The delayed wave detection unit 27 detects, from the frequency signal, the subcarrier having the delayed-wave power residing therein, and estimates the delay sample quantity ii of the delayed wave from a difference between the position of the estimated subcarrier carrying the delayed-wave power and the subcarrier position corresponding to the estimated FSK signal which the delayed wave detection unit 27 has obtained from the FSK demodulation unit 26 preceding the delayed wave detection unit 27 (step S27). The delayed wave detection unit 27 outputs the estimated delay sample quantity ii to the metric combining unit 25. The metric combining unit 25 obtains the delay sample quantity ii from the delayed wave detection unit 27 and uses that delay sample quantity ii in calculating the metric of the next symbol. Note that through various methods, the delayed wave detection unit 27 may estimate the subcarrier having the delayed wave residing therein. One of those methods is, by way of example, estimation based on threshold-based determination using statistical characteristics of noise: a technique for detecting the delayed wave by distinguishing a delayed-wave component from noise on the basis of average power, etc. However, the technique for detecting the delayed wave in the present embodiment is not limited thereto. In addition, the value of the delay sample quantity ii of the delayed wave output from the delayed wave detection unit 27 to the metric combining unit 25 may be based only on a value estimated from the current symbol, or may be a value with higher accuracy obtained by, for example, averaging estimated values for last several consecutive symbols. That is, the delayed wave detection unit 27 may output, to the metric combining unit 25, the delay sample quantity ii of the delayed wave estimated based on the last one symbol, or an average value of delay sample quantities ii of multiple delayed waves estimated based on multiple last symbols.

A hardware configuration of the transmission device 10 will next be described. In the transmission device 10, the transmitting antenna 14 is an antenna element. The FSK carrier spacing control unit 11, the FSK modulation unit 12, and the direct-sequence spreading unit 13 are implemented in processing circuitry. The processing circuitry may be a combination of a processor that executes a program stored in a memory and the memory, or may be a dedicated hardware element. The processing circuitry is also referred to as control circuit.

FIG. 6 is a diagram illustrating an example configuration of a processing circuitry 90 included in the transmission device 10 according to the first embodiment when the processing circuitry is implemented by a processor 91 and a memory 92. The processing circuitry 90 illustrated in FIG. 6 is a control circuit, and includes the processor 91 and the memory 92. When the processing circuitry 90 includes the processor 91 and the memory 92, each functionality of the processing circuitry 90 is implemented in software, firmware, or a combination of software and firmware. The software or firmware is described as a program, and is stored in the memory 92. In the processing circuitry 90, each functionality is implemented by the processor 91 by reading and executing a program stored in the memory 92. That is, the processing circuitry 90 includes the memory 92 for storing a program that causes the processing of the transmission device 10 to be performed. It can also be said that this program is a program for causing the transmission device 10 to perform each functionality implemented in the processing circuitry 90. This program may be provided through a storage medium storing the program, or through another means such as a communication medium.

It can also be said that the foregoing program is a program that causes the transmission device 10 to perform a first step in which the FSK modulation unit 12 performs frequency shift keying modulation on an information bit sequence that has been input to generate a frequency shift keying symbol, a second step in which the direct-sequence spreading unit 13 spreads the frequency shift keying symbol by direct-sequence spreading using a chirp sequence, and a third step in which the FSK carrier spacing control unit 11 controls a signal to be transmitted to the reception device 20 to prevent the delayed-wave component in multipath propagation from appearing in a frequency shift keying candidate carrier in one symbol of two consecutive symbols, in a frequency spectrum of a signal obtained by despreading in the reception device 20.

In this respect, the processor 91 is, for example, a central processing unit (CPU), a processing unit, a computing unit, a microprocessor, a microcomputer, a digital signal processor (DSP), or the like. In addition, the memory 92 is, for example, a non-volatile or volatile semiconductor memory such as a random access memory (RAM), a read-only memory (ROM), a flash memory, an erasable programmable ROM (EPROM), or an electrically EPROM (EEPROM) (registered trademark); a magnetic disk, a flexible disk, an optical disk, a compact disc, a MiniDisc, a digital versatile disc (DVD), or the like.

Figure 7:
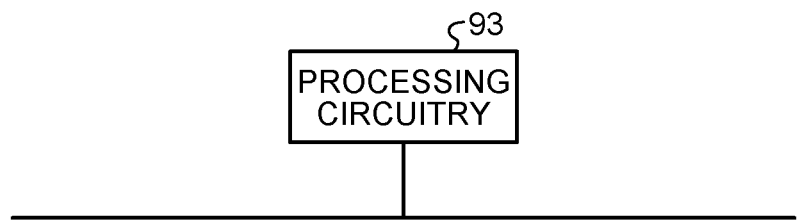
FIG. 7 is a diagram illustrating an example of a processing circuitry included in the transmission device according to the first embodiment when the processing circuitry is implemented by a dedicated hardware element.

FIG. 7 is a diagram illustrating an example of a processing circuitry 93 included in the transmission device 10 according to the first embodiment when the processing circuitry is implemented by a dedicated hardware element. The processing circuitry 93 illustrated in FIG. 7 is, for example, a single circuit, a set of multiple circuits, a programmed processor, a parallel programmed processor, an application specific integrated circuit (ASIC), a field programmable gate array (FPGA), or a combination thereof. The processing circuitry may be implemented partially in a dedicated hardware element, and partially in software or firmware. Thus, the processing circuitry can provide each functionality described above in a dedicated hardware element, software, firmware, or a combination thereof.

A hardware configuration of the transmission device 10 have been described. The reception device 20 also has a similar hardware configuration. In the reception device 20, the receiving antenna 21 is an antenna element. The despreading unit 22, the Fourier transform unit 23, the power calculation unit 24, the metric combining unit 25, the FSK demodulation unit 26, and the delayed wave detection unit 27 are implemented in processing circuitry. Similarly to the case of the transmission device 10, the processing circuitry may be a combination of a processor that executes a program stored in a memory and the memory, or may be a dedicated hardware element.

As described above, according to the present embodiment, using the phenomenon where an FSK-modulated narrowband signal is spread into a wideband signal by spectrum spreading based on a direct sequence technique, the transmission device 10 changes the spacing of the carrier corresponding to an FSK symbol in FSK modulation, on a per-transmission symbol basis. This enables the transmission device 10 to prevent a delayed-wave component from appearing in an FSK candidate carrier in consecutive transmission symbols while the conventional noncoherent detection method results in the reception device 20 failing in demodulation because of that delayed-wave component. That is, as long as the communication channel is coherent, the transmission device 10 can always avoid appearance of a delayed-wave component in an FSK candidate carrier in one symbol of two consecutive symbols.

In addition, the reception device 20 estimates the delay sample quantity $\tau_1$ of the delayed wave on the basis of an FSK symbol that has once been demodulated by hard decision, and generates a metric calculated by combining a preceding-wave component and a delayed-wave component, using an estimated value obtained for the last one or more symbols. This enables the reception device 20 to obtain a path diversity gain from the preceding wave and the delayed wave. Moreover, the transmission device 10 changes the FSK carrier spacing to thereby ensure that the reception device 20 avoids the situation where a delayed-wave component appears in an FSK candidate carrier in one symbol of two consecutive symbols. Thus, the reception device 20 can accurately estimate the delay sample quantity $\tau_1$ of the delayed wave for the symbol in which such a situation does not arise. For the symbol in which that situation arises, the reception device 20 can separate the delayed wave, which results in correct demodulation.

As described above, the transmission device 10 is capable of transmitting a signal to the reception device 20 employing noncoherent detection for frequency shift keying involving chirp spread spectrum, the signal enabling reception device 20 of the communication system 1 to avoid causing a demodulation error due to multipath propagation, and to benefit from a diversity effect of multipath propagation without using a pilot signal.

Second Embodiment

As described in the first embodiment, the transmission device 10 transmits a signal in such a manner to prevent the delayed-wave component from appearing in an FSK candidate carrier in one symbol of two consecutive symbols, in the frequency spectrum of a signal obtained by despreading in the reception device 20. A second embodiment will be described as to another method for yielding the same result as discussed in the first embodiment.

Figure 8:
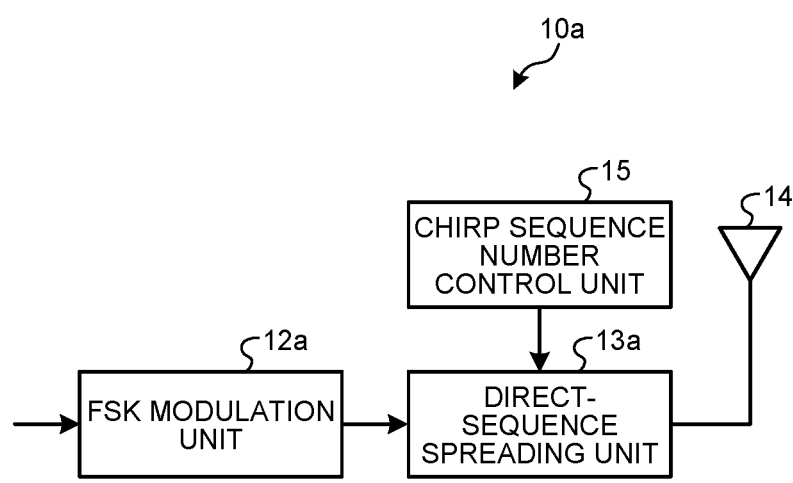
FIG. 8 is a block diagram illustrating an example configuration of a transmission device according to a second embodiment.
Figure 9:
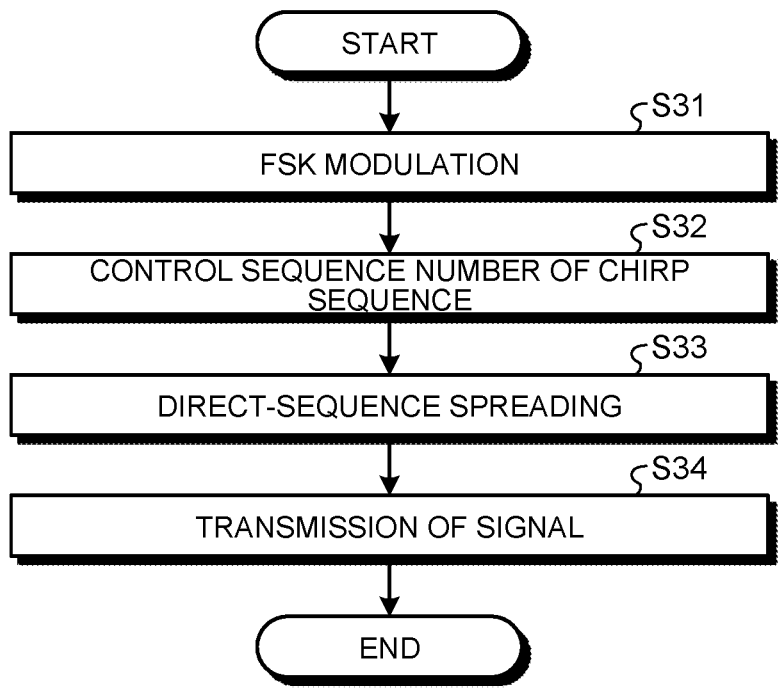
FIG. 9 is a flowchart illustrating an operation of the transmission device according to the second embodiment.

FIG. 8 is a block diagram illustrating an example configuration of a transmission device 10a according to a second embodiment. The transmission device 10a includes an FSK modulation unit 12a, a direct-sequence spreading unit 13a, the transmitting antenna 14, and a chirp sequence number control unit 15. FIG. 9 is a flowchart illustrating an operation of the transmission device 10a according to the second embodiment. Note that the communication system in the second embodiment includes the transmission device 10a in place of the transmission device 10 of the communication system 1 illustrated in FIG. 1.

The FSK modulation unit 12a performs FSK modulation (step S31). The second embodiment is based on the assumption that all the symbols have the same FSK carrier spacing in FSK modulation of the FSK modulation unit 12a.

The chirp sequence number control unit 15 controls the sequence number of the chirp sequence for use, on a per-symbol basis (step S32). Specifically, the chirp sequence number control unit 15 changes the value of q in Equation (2) above on a per-symbol basis. In particular, the chirp sequence number control unit 15 ensures that chirp sequence numbers selected for two respective consecutive symbols are prime to each other. As a result, the transmission device 10a to change the subcarrier position where the delayed-wave component appears, keeping the position of the FSK candidate carrier unchanged on a per-symbol basis.

On the basis of the sequence number of the chirp sequence determined by the chirp sequence number control unit 15, the direct-sequence spreading unit 13a spreads the FSK symbol generated by the FSK modulation unit 12a by direct-sequence spreading using a chirp sequence (step S33).

The transmitting antenna 14 transmits, to the reception device 20, the signal $x_n$ generated using direct-sequence spreading by the direct-sequence spreading unit 13a (step S34).

In the second embodiment, the chirp sequence number control unit 15 is a control unit that controls the signal to be transmitted to the reception device 20 in such a manner as to prevent the delayed-wave component in multipath propagation from appearing in an FSK candidate carrier in one symbol of two consecutive symbols, in a frequency spectrum of a signal obtained by despreading in the reception device 20. Specifically, the chirp sequence number control unit 15 changes the chirp sequence number on a per-symbol basis in such a manner that chirp sequence numbers selected for two respective consecutive symbols are prime to each other.

Note that the configuration and the operation of the reception device 20 in the second embodiment are similar to those of the first embodiment, and description of the configuration and the operation of the reception device 20 in the second embodiment will therefore be omitted.

A hardware configuration of the transmission device 10a will next be described. In the transmission device 10a, the transmitting antenna 14 is an antenna element. The FSK modulation unit 12a, the direct-sequence spreading unit 13a, and the chirp sequence number control unit 15 are implemented in processing circuitry. The processing circuitry may be a combination of a processor that executes a program stored in a memory and the memory, or may be a dedicated hardware element.

As described above, according to the present embodiment, the transmission device 10a changes the chirp sequence number from symbol to symbol. Also in this case, the transmission device 10a and the reception device 20 can provide an advantage similar to the advantage of the first embodiment.

A transmission device according to the present disclosure is advantageous in transmitting the signal to the reception device of the wireless communication system employing noncoherent detection for frequency shift keying modulation involving chirp spread spectrum, the signal enabling the reception device to avoid causing the demodulation error due to multipath propagation, and to benefit from the diversity effect of multipath propagation without using a pilot signal.

The configurations described in the foregoing embodiments are merely examples. These configurations may be combined with a known other technology, and configurations of different embodiments may be combined together. Moreover, part of the configurations may be omitted and/or modified without departing from the spirit thereof.

What is claimed is:

1. A transmission device to wirelessly communicate with a reception device,
the transmission device comprising:
modulation circuitry to perform frequency shift keying modulation on an input information bit sequence to generate a frequency shift keying symbol;
direct-sequence spreading circuitry to spread the frequency shift keying symbol by direct-sequence spreading using a chirp sequence; and
control circuitry to control a signal to be transmitted to the reception device in such a manner as to prevent a delayed-wave component in multipath propagation from appearing in a frequency shift keying candidate carrier in one symbol of two consecutive symbols, in a frequency spectrum of a signal obtained by despreading in the reception device.

2. The transmission device according to claim 1, wherein
the control circuitry changes the carrier spacing of the frequency shift keying symbol on a per-symbol basis in such a manner that carrier spacings of the frequency shift keying symbols selected for the two respective consecutive symbols are prime to each other, and
the modulation circuitry performs the frequency shift keying modulation on the basis of the carrier spacing of the frequency shift keying symbol determined by the control circuitry.

3. The transmission device according to claim 1, wherein
the control circuitry changes the chirp sequence number on a per-symbol basis in such a manner that chirp sequence numbers selected for the two respective consecutive symbols are prime to each other and
the direct-sequence spreading circuitry spreads the frequency shift keying symbol by direct-sequence spreading, on the basis of the chirp sequence number determined by the control circuitry.

4. A reception device to wirelessly communicate with a transmission device,
the reception device comprising:
despreading circuitry to despread a signal transmitted from the transmission device and received by the reception device;
Fourier transform circuitry to perform Fourier transform on a signal obtained by despreading to generate a frequency signal;

power calculation circuitry to calculate power of each subcarrier in the frequency signal;
metric combining circuitry to add, on the basis of a number of delay samples of a delayed wave, power of a subcarrier at a position cyclically shifted in a forward direction by the number of delay samples from a candidate point of each frequency shift keying candidate carrier, to a metric of a corresponding frequency shift keying candidate symbol to calculate a combined metric;
demodulation circuitry to perform a hard decision on the combined metric of each frequency shift keying candidate symbol, and to estimate a transmitted frequency shift keying signal from the transmission device; and
delayed wave detection circuitry to detect a subcarrier having delayed-wave power residing therein, from the frequency signal, and to estimate the number of delay samples of the delayed wave from a difference between a position of the subcarrier carrying the delayed-wave power and a subcarrier position corresponding to the estimated transmitted frequency shift keying signal.

5. The reception device according to claim 4, wherein the delayed wave detection circuitry estimates the number of delay samples of the delayed wave by threshold-based determination using a statistical characteristic of noise.

6. The reception device according to claim 4, wherein the metric combining circuitry calculates the combined metric by a maximal ratio combining rule or a selection combining rule.

7. The reception device according to claim 4, wherein the delayed wave detection circuitry outputs the number of delay samples of the delayed wave estimated from a last one symbol or an average value of numbers of delay samples of a plurality of delayed waves estimated from a plurality of last symbols.

8. A communication system comprising:
a transmission device; and
the reception device according to claim 4, wherein
the transmission device wirelessly communicates with the reception device, and
the transmission device comprising:
modulation circuitry to perform frequency shift keying modulation on an input information bit sequence to generate a frequency shift keying symbol;
direct-sequence spreading circuitry to spread the frequency shift keying symbol by direct-sequence spreading using a chirp sequence; and
control circuitry to control a signal to be transmitted to the reception device in such a manner as to prevent a delayed-wave component in multipath propagation from appearing in a frequency shift keying candidate carrier in one symbol of two consecutive symbols, in a frequency spectrum of a signal obtained by despreading in the reception device.

9. A control circuit for controlling a transmission device to wirelessly communicate with a reception device,
the control circuit causing the transmission device to:
perform frequency shift keying modulation on an input information bit sequence to generate a frequency shift keying symbol;
spread the frequency shift keying symbol by direct-sequence spreading using a chirp sequence; and
control a signal to be transmitted to the reception device in such a manner as to prevent a delayed-wave component in multipath propagation from appearing in a frequency shift keying candidate carrier in one symbol of two consecutive symbols, in a frequency spectrum of a signal obtained by despreading in the reception device.

10. A control circuit for controlling a reception device to wirelessly communicate with a transmission device,
the control circuit causing the reception device to:
despread a signal transmitted from the transmission device and received by the reception device;
perform Fourier transform on a signal obtained by despreading to generate a frequency signal;
calculate power of each subcarrier in the frequency signal;
add, on the basis of a number of delay samples of a delayed wave, power of a subcarrier at a position cyclically shifted in the forward direction by the number of delay samples from a candidate point of each frequency shift keying candidate carrier, to a metric of a corresponding frequency shift keying candidate symbol to calculate a combined metric;
perform a hard decision on the combined metric of each frequency shift keying candidate symbol, and estimating a transmitted frequency shift keying signal from the transmission device; and
detect a subcarrier having delayed-wave power residing therein, from the frequency signal, and estimating the number of delay samples of the delayed wave from a difference between a position of the subcarrier carrying the delayed-wave power and a subcarrier position corresponding to the estimated transmitted frequency shift keying signal.

11. A non-transitory storage medium storing a program for controlling a transmission device to wirelessly communicate with a reception device, wherein
the program causes the transmission device to:
perform frequency shift keying modulation on an input information bit sequence to generate a frequency shift keying symbol,
spread the frequency shift keying symbol by direct-sequence spreading using a chirp sequence, and
control a signal to be transmitted to the reception device in such a manner as to prevent a delayed-wave component in multipath propagation from appearing in a frequency shift keying candidate carrier in one symbol of two consecutive symbols, in a frequency spectrum of a signal obtained by despreading in the reception device.

12. A non-transitory storage medium medium storing a program for controlling a reception device to wirelessly communicate with a transmission device, wherein
the program causes the reception device to:
despread a signal transmitted from the transmission device and received by the reception device,
perform Fourier transform on a signal obtained by despreading to generate a frequency signal,
calculate power of each subcarrier in the frequency signal,
add, on the basis of a number of delay samples of a delayed wave, power of a subcarrier at a position cyclically shifted in the forward direction by the number of delay samples from a candidate point of each frequency shift keying candidate carrier, to a metric of a corresponding frequency shift keying candidate symbol to calculate a combined metric,
perform a hard decision on the combined metric of each frequency shift keying candidate symbol, and estimating a transmitted frequency shift keying signal from the transmission device, and
detect a subcarrier having delayed-wave power residing therein, from the frequency signal, and estimating the number of delay samples of the delayed wave from a difference between a position of the subcarrier carrying the delayed-wave power and a subcarrier position corresponding to the estimated transmitted frequency shift keying signal.

13. A transmission method for use in a transmission device to wirelessly communicate with a reception device, the transmission method comprising:
performing frequency shift keying modulation on an input information bit sequence to generate a frequency shift keying symbol;
spreading the frequency shift keying symbol by direct-sequence spreading using a chirp sequence; and
controlling a signal to be transmitted to the reception device in such a manner as to prevent a delayed-wave component in multipath propagation from appearing in a frequency shift keying candidate carrier in one symbol of two consecutive symbols, in a frequency spectrum of a signal obtained by despreading in the reception device.

14. A reception method for use in a reception device to wirelessly communicate with a transmission device, the reception method comprising:
despreading a signal transmitted from the transmission device and received by the reception device;
performing Fourier transform on a signal obtained by despreading to generate a frequency signal;
calculating power of each subcarrier in the frequency signal;
adding, on the basis of a number of delay samples of a delayed wave, power of a subcarrier at a position cyclically shifted in the forward direction by the number of delay samples from a candidate point of each frequency shift keying candidate carrier, to a metric of a corresponding frequency shift keying candidate symbol to calculate a combined metric;
performing a hard decision on the combined metric of each frequency shift keying candidate symbol, and estimates a transmitted frequency shift keying signal from the transmission device; and
detecting a subcarrier having delayed-wave power residing therein, from the frequency signal, and estimating the number of delay samples of the delayed wave from a difference between a position of the subcarrier carrying the delayed-wave power and a subcarrier position corresponding to the estimated transmitted frequency shift keying signal.

* * * * *